United States Patent
Yonezawa

(10) Patent No.: US 6,923,427 B2
(45) Date of Patent: Aug. 2, 2005

(54) MOTOR-OPERATED VALVE

(75) Inventor: Toru Yonezawa, Osaka (JP)

(73) Assignee: Chiyoda Kuchokiki Co., Ltd., Osaka (JP)

( * ) Notice: Subject to any disclaimer, the term of this patent is extended or adjusted under 35 U.S.C. 154(b) by 137 days.

(21) Appl. No.: 10/344,002

(22) PCT Filed: Sep. 9, 2002

(86) PCT No.: PCT/JP02/09206
§ 371 (c)(1),
(2), (4) Date: Feb. 13, 2003

(87) PCT Pub. No.: WO2004/003414
PCT Pub. Date: Jan. 8, 2004

(65) Prior Publication Data
US 2005/0145810 A1 Jul. 7, 2005

(30) Foreign Application Priority Data
Jun. 26, 2002 (JP) .......................... 2002-186538

(51) Int. Cl.⁷ .............................................. F16K 31/02
(52) U.S. Cl. ................................... 251/129.11; 251/77
(58) Field of Search ....................... 251/129.11, 129.12, 251/129.13, 77

(56) References Cited

U.S. PATENT DOCUMENTS

| | | | | |
|---|---|---|---|---|
| 3,080,952 A | * | 3/1963 | Carlstedt ............... | 251/129.11 |
| 3,488,030 A | * | 1/1970 | Hulme et al. ........... | 251/129.12 |
| 4,556,193 A | * | 12/1985 | Yoshiga ................. | 251/129.11 |
| 4,911,404 A | * | 3/1990 | Dorste et al. .......... | 251/129.11 |
| 5,249,775 A | * | 10/1993 | Tabatabai ............. | 251/77 |
| 5,364,066 A | * | 11/1994 | Dorste et al. .......... | 251/129.11 |
| 5,419,531 A | * | 5/1995 | Hoehn .................. | 251/129.11 |
| 5,851,003 A | * | 12/1998 | Aoki et al. ............. | 251/129.11 |

FOREIGN PATENT DOCUMENTS

| | | |
|---|---|---|
| JP | 4-10532 Y2 | 3/1992 |
| JP | 6-174129 A | 6/1994 |
| JP | 8-49782 A | 2/1996 |

* cited by examiner

Primary Examiner—Eric Keasel
(74) Attorney, Agent, or Firm—Bacon & Thomas, PLLC

(57) ABSTRACT

A valve spindle is provided with a screw thread part which meshes with a valve body to move the valve spindle forwards and backwards. Provided between a rotation driving member and the valve spindle is an interlocking part which transmits a force of rotation of the driving member to the valve spindle and allows the valve spindle's forward and backward movement following its rotation. A bring-back preventing part is provided at a location continuous with the interlocking part to prevent movement of the valve spindle in response to rotation of the driving member in the direction of opening the valve on the basis of exciting pulses excessively supplied to the stepping motor during a valve closing operation.

1 Claim, 11 Drawing Sheets

Section taken in the line A—A

Section taken in the line B—B

Fig. 13

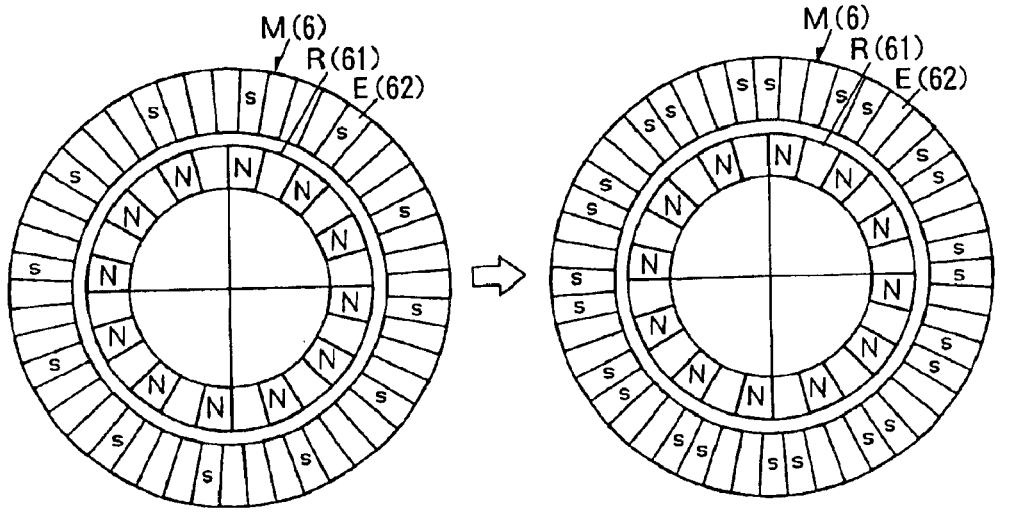

① Relative position of rotor and stator at the moment the valve is closed
(at which position magnet can no longer turn counterclockwise)

② The position that three pulses have been applied after the valve's being closed
(wherein magnet is subjected to a counterclockwise force)

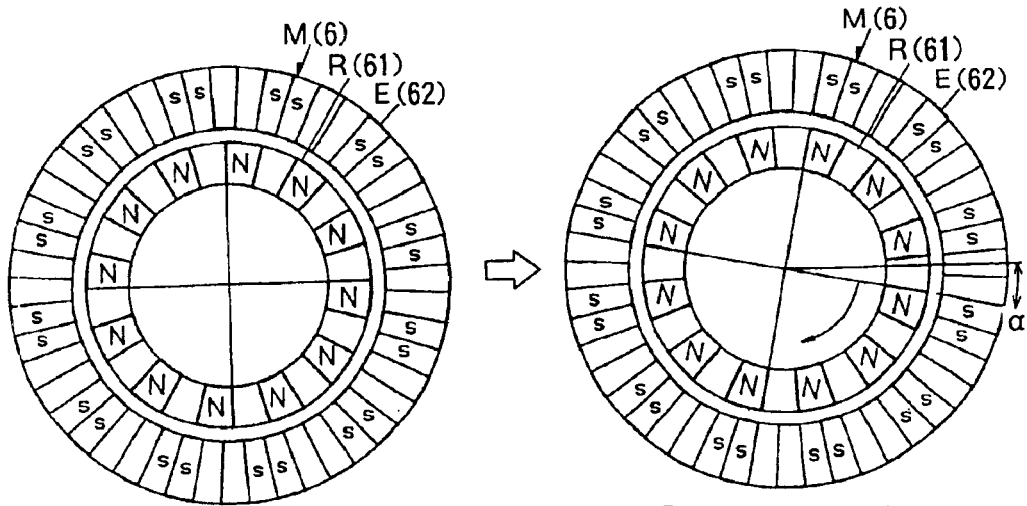

③ (magnet is in the state of immediately before turning)
The position that five pulses have been applied after the valve's being closed
(wherein magnet is subjected to a clockwise force and turns a little)

④ (magnet turned)

$\alpha = 11.25° \sim 15°$

MOTOR-OPERATED VALVE

FIELD OF THE INVENTION

The present invention relates to an electrically driven valve arranged mainly on a refrigerant piping of an air conditioner and a refrigerating apparatus to control a flow or the like.

BACKGROUND OF THE INVENTION

The electrically driven valve of this kind comprises a valve spindle V having a valve head H that is seated on or moved away from a seat Z provided in a valve body D as exemplified in FIG. 12 and as disclosed in Japanese Patent No. 3181118. A bush P having an internal thread F and a bearing part J is fixed in the valve body D while fixed in a rotor R of a stepping motor M is a valve holder W having an external thread T to mesh with the internal thread F and a journal K to slide on the bearing part J.

The valve spindle V is assembled in the valve holder W and a fixing ring L is fit onto an open side. An upper part of the valve holder W is inserted into a receiving member G fixed on a rotor casing C, and a return spring U is interposed between the receiving member G and the rotor R to mesh the external thread T with the internal thread F after disengagement due to full opening of valve. A valve spindle urging spring Q is interposed between the valve holder W and the valve spindle V to urge the valve spindle V in the direction of closing the valve.

And predetermined exciting pulses are supplied to a stator E of the stepping motor M to rotate the rotor R regularly and irregularly so as to move the valve spindle forwards and backwards, thereby changing the sectional area of the opening between the valve seat Z and the valve head H to carry out the flow control.

In the above conventional art, upon closing the valve, the valve head H is pushed against the valve seat Z by the force of the valve spindle urging spring Q. Thus, when upstream and downstream sides with respect to the closed valve seat Z part are subjected, in the direction of opening the valve, to an excessively large differential pressure which results from a transitional change of refrigerant pressure or other causes and is larger than the urging force of the spindle-urging spring Q, such problem is caused that the valve spindle V is lifted and not able to keep closing the valve.

Closing the valve may employ, in place of the spindle-urging spring Q, a structure of fastening the valve spindle V onto the valve seat Z by use of screw threads directly provided on the valve spindle, in order to improve stability upon closing valve. For example, in FIG. 12, there may be not adopted the screwing between the bush P and the valve holder W but may use such features that the valve spindle V is directly provided on the outer periphery with a male thread part T which is meshed with a female thread F of the bush P, and the valve spindle V is rotated following the valve holder W at the rotor R side.

However, as shown in FIG. 13, upon initializing the electrically driven valve, the stator E of the stepping motor M is given the exciting pulses excessively and in the direction of closing the valve (FIG. 14). In this case, there is a fear that the stepping motor M steps out and the rotor R causes bringing back of the valve spindle, thereby causing the valve spindle to move up and down slightly.

From the position (①) in FIG. 13 that defined at the moment of the valve's being closed following the rotor R turning counterclockwise to another position ((②)) that defined by three pulses after the position ((①)), N poles of the rotor R are attracted by S poles of the stator E moving away counterclockwise, so that the rotor R is subjected to a force in the direction of closing the valve. At the position ((③)) defined by five pulses after the valve's being closed, N poles of the rotor R are attracted by S poles of the stator E turning clockwise to approach the N poles, and the rotor R is given a force in the direction of opening the valve. Thus, the rotor R turns regularly or irregularly in a certain extent of angle α ((④)), and the valve spindle moves up and down with the screwing being slackened and tightened, resulting in that the state of the valve's being closed is not able to be kept.

BRIEF DESCRIPTION OF THE INVENTION

An object of the present invention is to provide an improved electrically driven valve wherein the state of the valve's being closed is kept excellently when exciting pulses are applied in the direction of further closing the valve in the state of the valve's being closed as in the case of the initializing of the electrically driven valve.

The invention is an electrically driven valve which comprises a valve spindle moved forwards and backwards following a rotation driving member driven by a stepping motor to cause a valve head to be seated on and moved away from a valve seat formed in a valve body, wherein to achieve the foregoing object the valve spindle is provided with a screw thread part which meshes with the valve body side to move the valve spindle forwards and backwards; provided between the rotation driving member and the valve spindle is an interlocking part which transmits a force of rotation of the rotation driving member to the valve spindle and allows the valve spindle's forward and backward movement following its rotation; and there is provided a bring-back preventing part, at a location continuous with the interlocking part and near the valve spindle's specific position for closing the valve, to disengage the pin and groove and prevent interlocking of the driving member with the valve spindle in case the driving member continues to rotate in the direction of opening the valve on the basis of exciting pulses excessively supplied to the stepping motor during a valve closing operation.

Accordingly, rotation of the rotation driving member causes the valve spindle to be rotated through the interlocking part and moved forwards and backwards by means of the screw thread part. Upon closing the valve, the valve spindle is tightened to the valve seat by means of the screw thread part, so that stability of the valve spindle upon closing the valve is increased. Meanwhile, for example, upon the initializing of the electrically driven valve, when exciting pulses are supplied excessively to the stepping motor upon closing the valve and the rotation driving member shifts in a predetermined angle in the direction of opening the valve, the bring-back preventing part causes the rotation driving member's shifting to have no interlocking with the valve spindle, thereby preventing the valve spindle from moving up and down with the screw thread part being slackened and tightened, resulting in that the state of the valve's being closed is kept excellently.

The invention described in claim 2 is an electrically driven valve wherein by better aligning the magnetic poles to reduce dispersion of specific amounts of exciting pulses from the state of the valve's being closed to the start of opening the valve in order to improve controllability, the whole structure is so set up that when standard exciting pulses are supplied to the stepping motor with the valve spindle being in position of closing the valve, the rotor of the stepping motor is positioned in a stable position in the direction of turning.

Accordingly, in the state of the valve's being closed, specific magnetic poles on the stator and the rotor of the stepping motor face mutually to have a stable positional relationship in the direction of turning. Hence, in association with the sure operating mechanism that allows the valve spindle to move forwards and backwards through the screw thread part, dispersion of specific amounts of exciting pulses supplied from the state of the valve's being closed to the start of opening the valve is reduced. Thus, even when the initializing of the valve is repeated, a stable valve-opening operation is carried out, enabling the extent of hysteresis in the flow control properties to be lowered, improving controllability, whereby enabling controlling temperatures or the like for air-conditioners to be carried out excellently.

BRIEF DESCRIPTION OF THE DRAWINGS

FIG. 13 is an explanatory view for the bring-back phenomenon.

MOST PREFERABLE EMBODIMENTS FOR USING THE INVENTION

Figure 1:
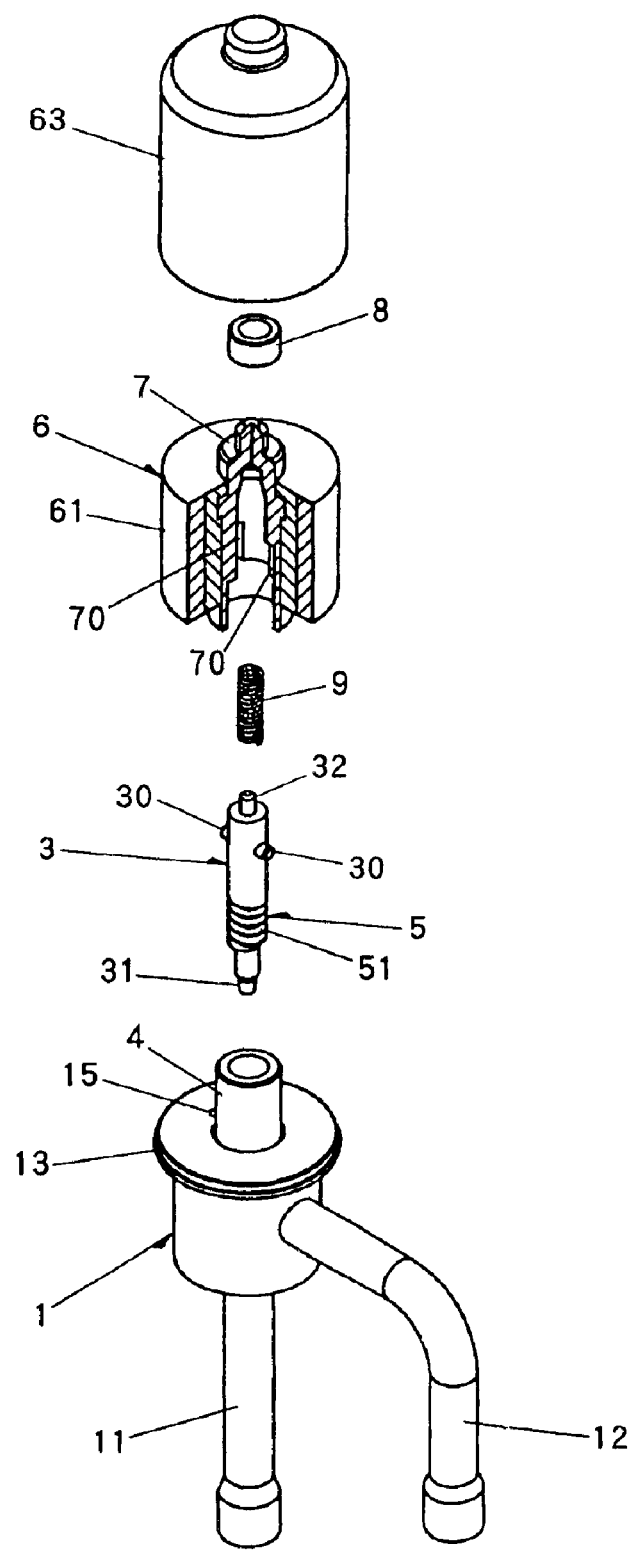
FIG. 1 is an explanatory view of setting up a first embodiment of the electrically driven valve according to the present invention.
Figure 2:
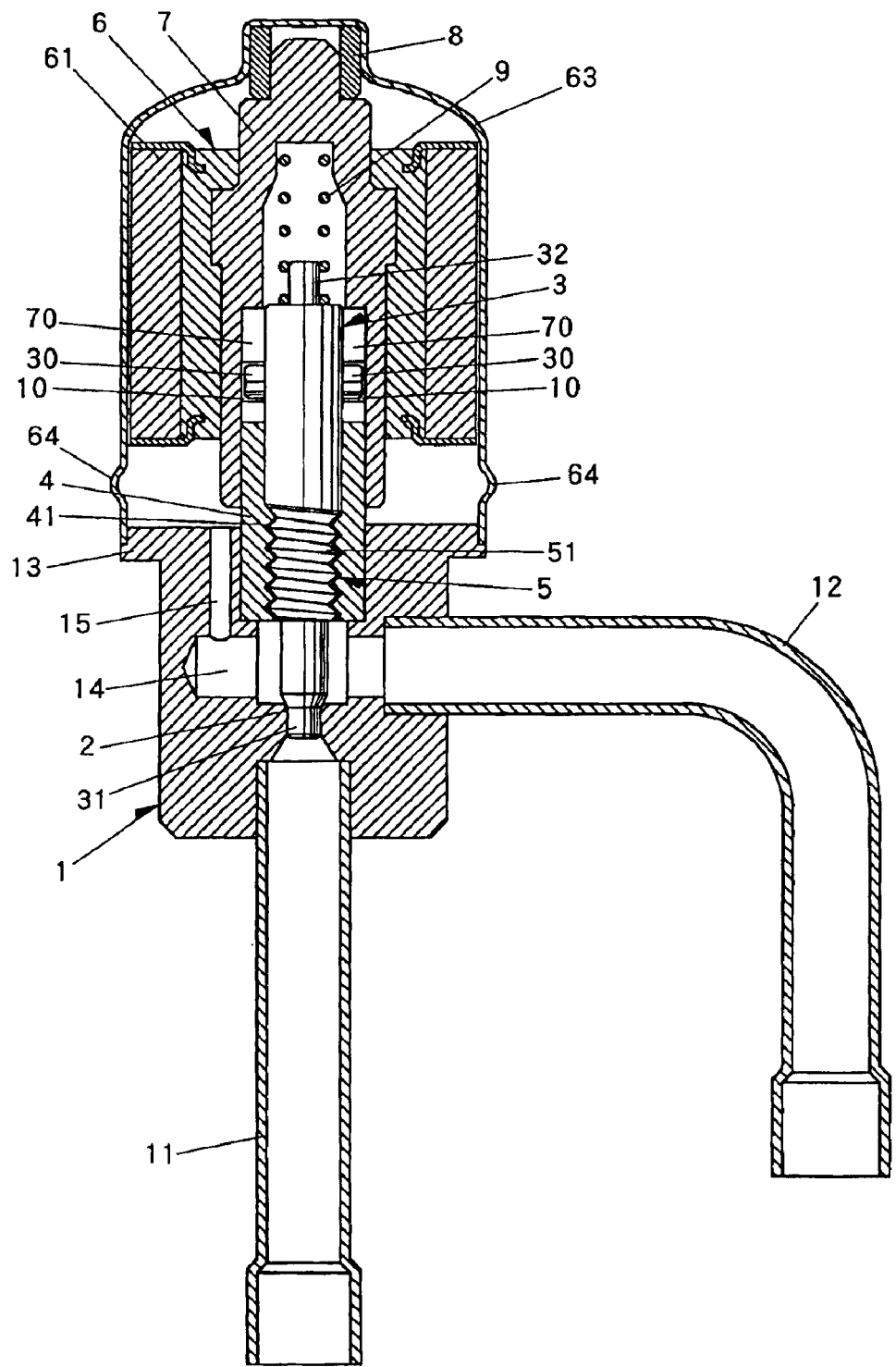
FIG. 2 is a longitudinal sectional view of the first embodiment.
Figure 3:
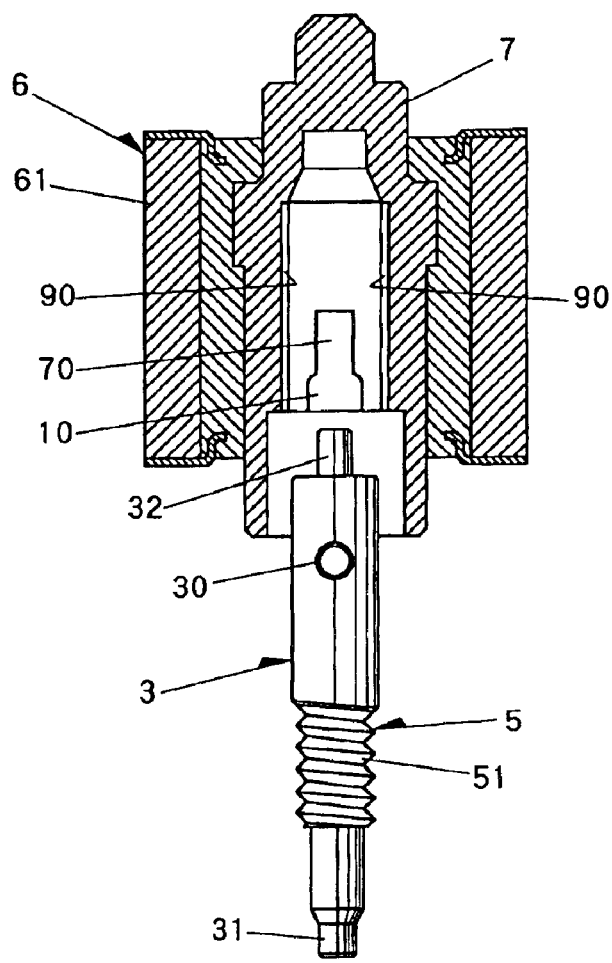
FIG. 3 is a longitudinal sectional view of a principal portion of the first embodiment.
Figure 4:
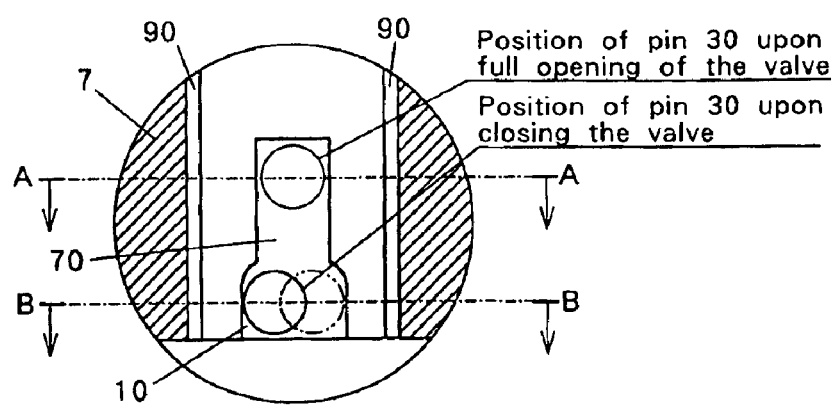
FIG. 4 is a partially enlarged view of FIG. 3.
Figure 5:
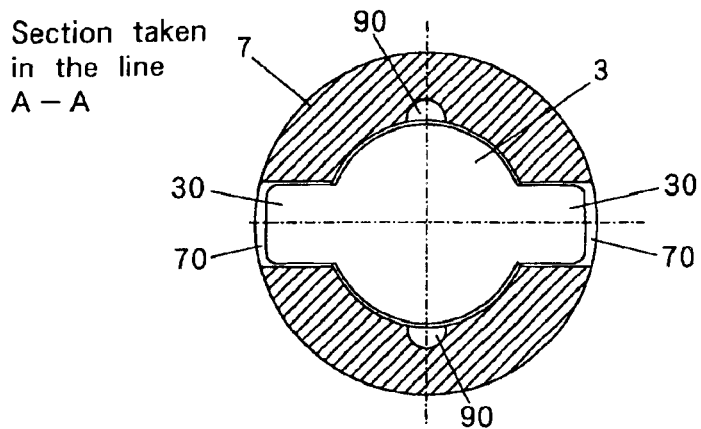
FIG. 5 is a sectional view taken in the line A—A in FIG. 4.
Figure 6:
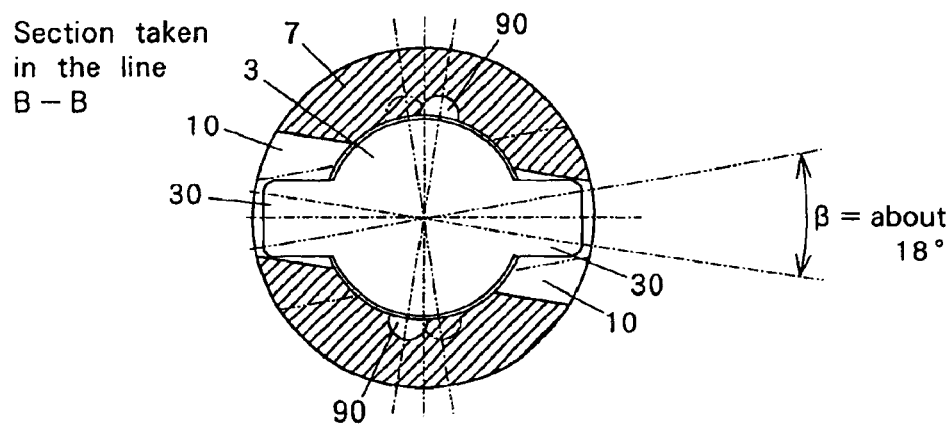
FIG. 6 is a sectional view taken in the line B—B in FIG. 4.

As shown in FIGS. 1 and 2, a first connecting piping 11 and a second connecting piping 12 are coupled to a valve body 1 in a manner of extending rectangularly. The first connecting piping 11 is connected, for example, to the outdoor unit side and the second connecting piping 12 to the indoor unit side. A valve seat 2 is formed inside the valve body 1 and a valve head 31 in the shape of a needle integrated at an end of a valve spindle 3 in the shape of a cylinder faces the valve seat 2.

The valve spindle 3 is provided with a screw thread part 5 which comprises a male thread 51 to be screwed with a female thread 41, which is formed on the inside of a lower bearing 4 press-fit into the valve body 1, to move the valve spindle 3 forwards and backwards. The screw thread part 5 consists of a larger lead screw thread which has larger thread lead r with respect to specific peripheral extent q corresponding to an average thread diameter, i.e., the thread gradient r/q is set to be 8% or more.

The valve spindle 3 is housed in a valve holder 7 serving as a rotation driving member integrated with a magnet rotor 61 of a stepping motor 6. A pin 30 projecting on both sides of the valve spindle 3 is fit, in a manner of freely sliding, into a pair of grooves 70 in the valve holder 7 to form an interlocking part that transmits a force of rotation of the magnet rotor 61 to the valve spindle 3 and allows forward and backward movement of the valve spindle 3 following its rotation. Width of the groove 70 may be equal to the diameter of the pin 30.

A lower part of the valve holder 7 is received by an outer peripheral part of the lower bearing 4 and an upper part of the valve holder 7 by an upper bearing 8 inside a rotor casing 63 welded to a flange 13 of the valve body 1. A stabilizing spring 9 which is compressed upon a valve-full opening operation of the valve spindle 3 is interposed between a spring holder 32 on the valve spindle 3 and the valve holder 7. An inside space 14 of the valve body 1 and the inside of the rotor casing 63 communicate with each other through a pressure-equalizing bore 15.

An ordinary position of the valve spindle's valve-full opening operation is that defined by the spindle's backward movement for a distance corresponding to predetermined pulses with respect to the spindle's position for closing the valve. In case that the valve spindle is in the valve-full opening operation position where the screw threads 41 and 51 are not disconnected from each other, and if the valve spindle 3 is turned excessively in the direction of opening the valve, the screwing of the screw threads is adapted to be disconnected so as to prevent the valve spindle 3 from excessively moving up.

As shown in FIGS. 3 to 6, there is provided a bring-back preventing part 10 consisting of parallel widened grooves which is in continuation to the groove 70 forming the foregoing interlocking part and at an opening portion of the groove 70 near the valve spindle's valve-closing position and prevents the pin 30 and the groove from abutting against with each other in the direction of rotating so as to cause the pin and the groove to have no interlocking, even in case that the magnet rotor 61 shifts in the valve-opening direction due to exciting pulses excessively supplied to the stepping motor 6 upon closing the valve.

The width of the groove of the bring-back preventing part 10 is set to be in such extent that the magnet rotor 61, i.e., the valve holder 7 when turns reverse in a predetermined angle β (about 18°) does not abut against the pin 30. The angle β (about 18°) is provided by adding room to the angle α (11.25 to 15°) shown in FIG. 13.

Figure 14:
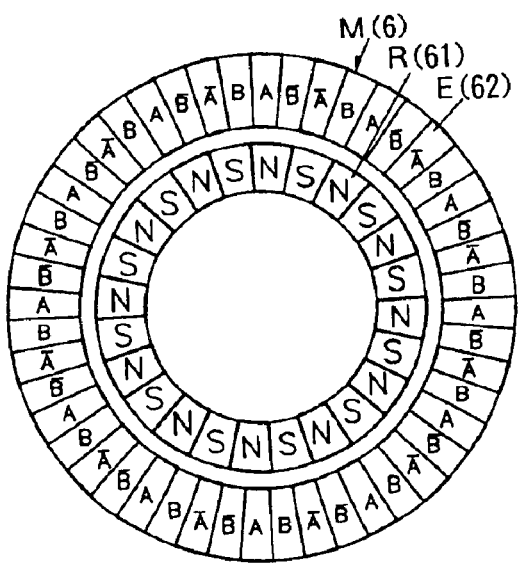
FIG. 14 is a diagram showing specific patterns of exciting pulses supplied to the stepping motor.

Specification of the stepping motor 6 and specific patterns of exciting pulses in this Example are as seen in FIGS. 13 and 14. In detail, the magnet rotor 61 has 24 poles including N and S poles and the stator 48 poles and turns 3.75° a step by 1–2 phases exciting system with eight steps a cycle and completes a revolution by 96 steps.

Figure 7:
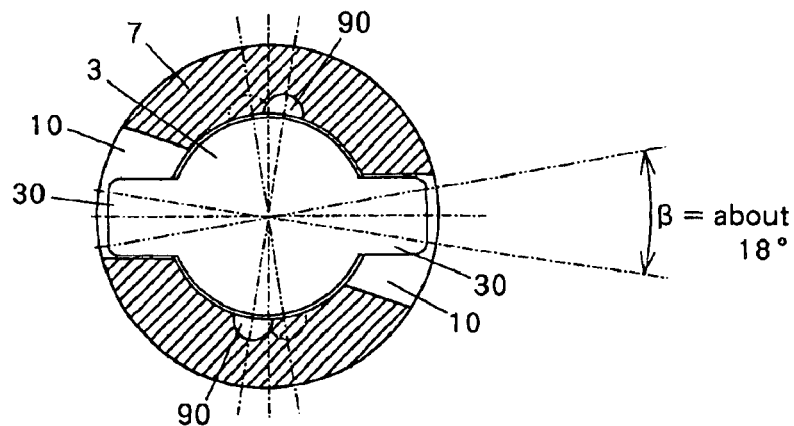
FIG. 7 is a sectional view of a modified example of the take-back preventing part.

As shown in FIG. 7, the bring-back preventing part 10 may use a groove in the form of a fan other than the parallel widened groove. In FIGS. 3 to 7, reference numeral 90 denotes a pressure-equalizing groove for equalizing pressure at the upper and back side of the valve spindle 3.

Figure 8:
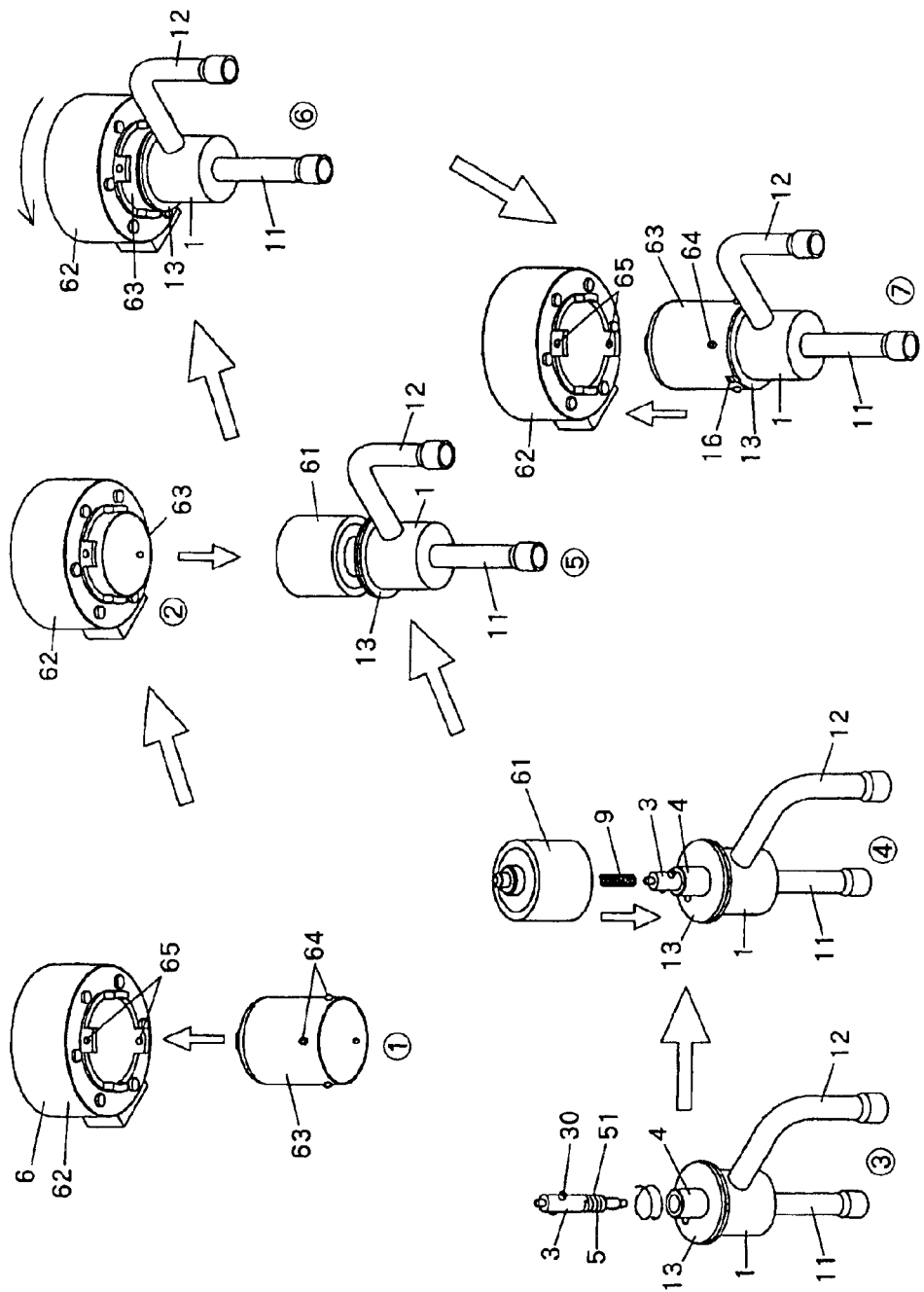
FIG. 8 is an explanatory view of the course of setting up the whole structure.

FIG. 8 shows the course of setting up the whole structure of the electrically driven valve. The stator 62 is inserted so that an outside dimple 64 on the rotor casing 63 is aligned with a rotation-stopper hole 65 on the stator 62 of the stepping motor 6 (①②). The valve spindle 3 is screwed in the lower bearing 4 until the valve spindle 3 stops, and a stabilizing spring 9 and the magnet rotor 61 are set up (③④⑤).

The rotor casing 63 is inserted until contacting with the flange 13, and standard exciting pulses, for example, any pattern of exciting pulses shown in FIG. 14 is supplied to the stator 62. At a position that when the stator 62 is turned manually in the direction indicated by the arrow, there feels no force of pushing back the stator 62, and the magnet rotor 61 becomes stable in the direction of rotation, the rotor casing 63 is inserted until an end surface of the rotor casing 63 abuts against the flange 13 (⑥).

An identification sign 16 is marked as extending between the rotor casing 63 and the flange 13. Exciting pulses of 100 pulses or more for moving the valve spindle 3 backwards in the direction of opening the valve are supplied. Preparation is made for a process of filling inactive gas in the inside of the valve to be carried out upon welding operation in the following processes. The stator 62 is removed from the rotor casing 63 and sent to the following processes for finishing the valve (⑦).

Figure 9:
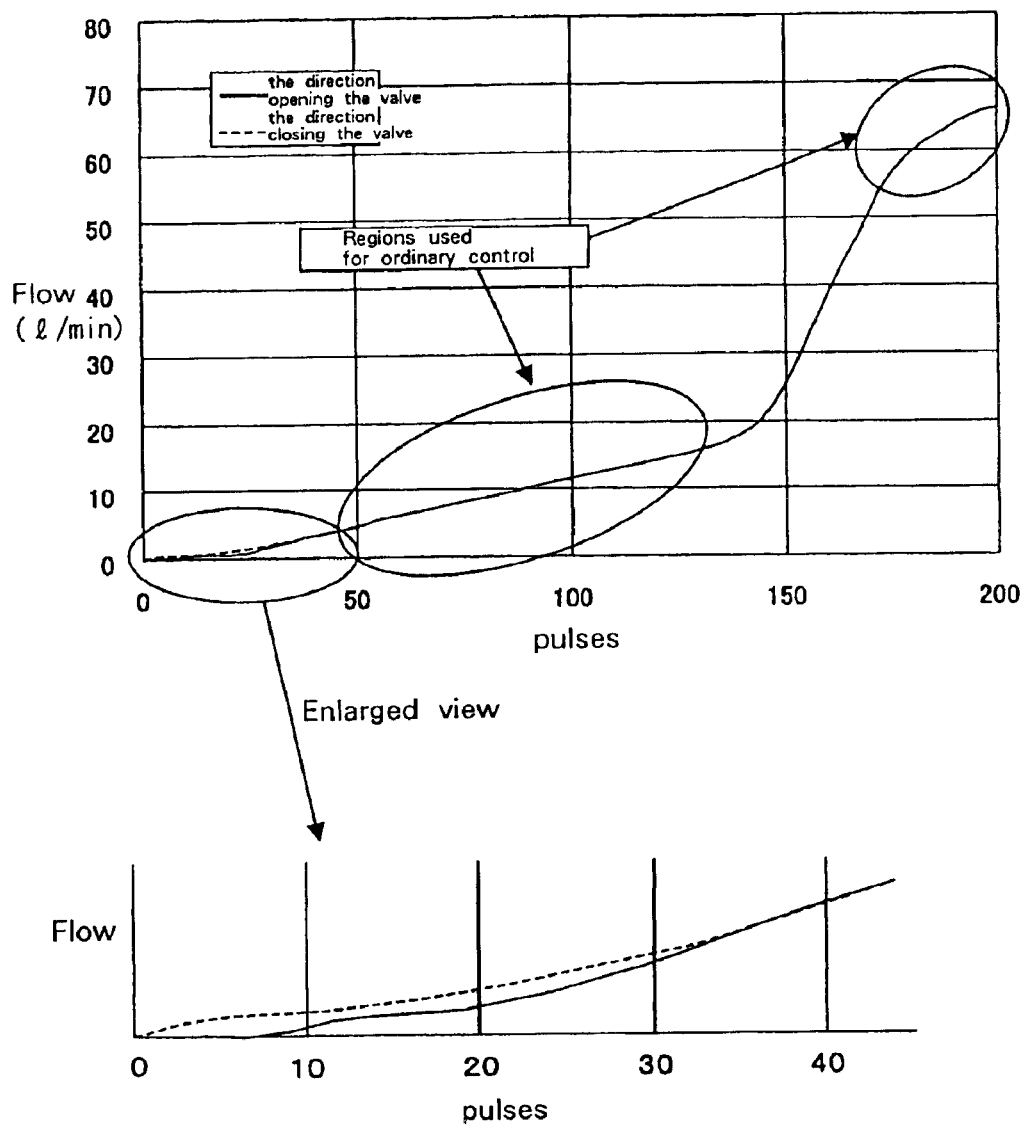
FIG. 9 is a diagram of properties of flow control.

FIG. 9 shows the properties of flow control with respect to exciting pulses supplied to the stepping motor 6. Near a point of closing the valve, there appears some hysteresis between the valve-opening direction and the valve-closing direction due to play of the pin 30 and the groove 70 in the direction of rotation provided by the bring-back preventing part 10. But, regions in which the valve is used by an ordinary control have almost no hysteresis in the valve-opening direction and the valve-closing direction but show excellent properties.

Figure 10:
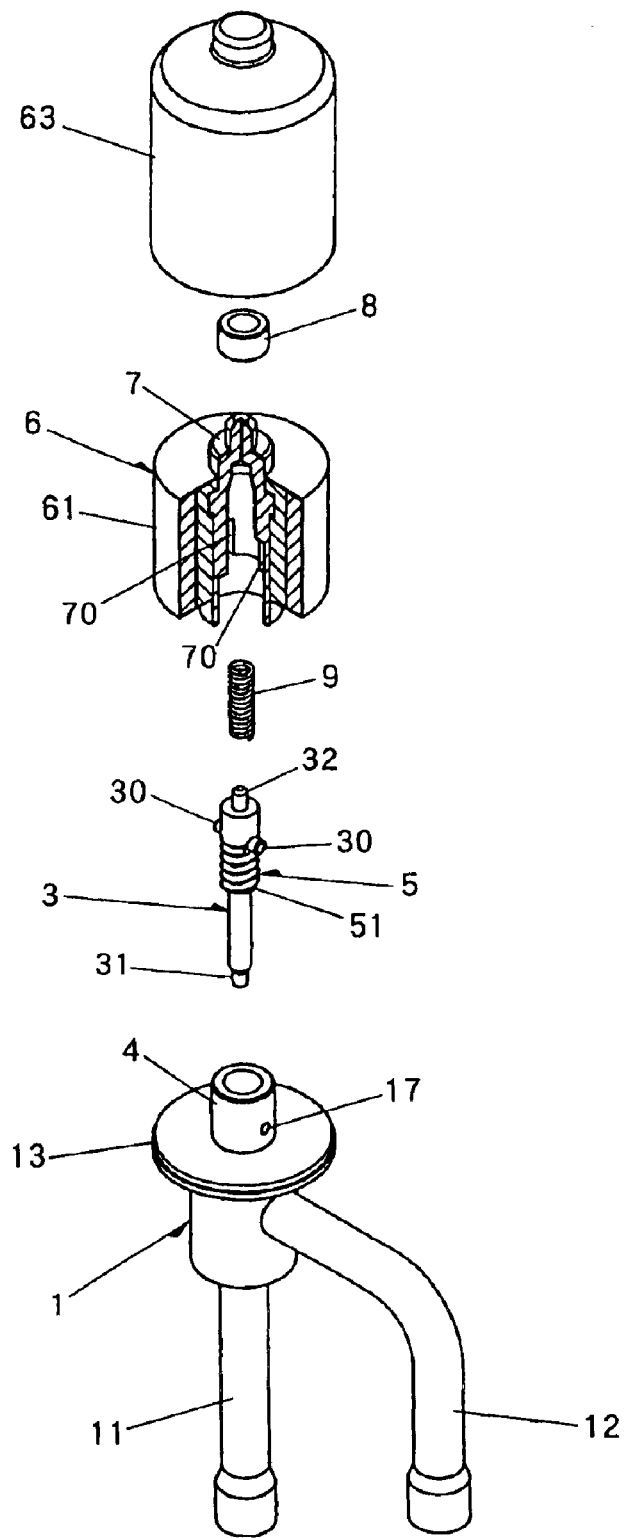
FIG. 10 is an explanatory view of setting up a second embodiment of the electrically driven valve according to the present invention.
Figure 11:
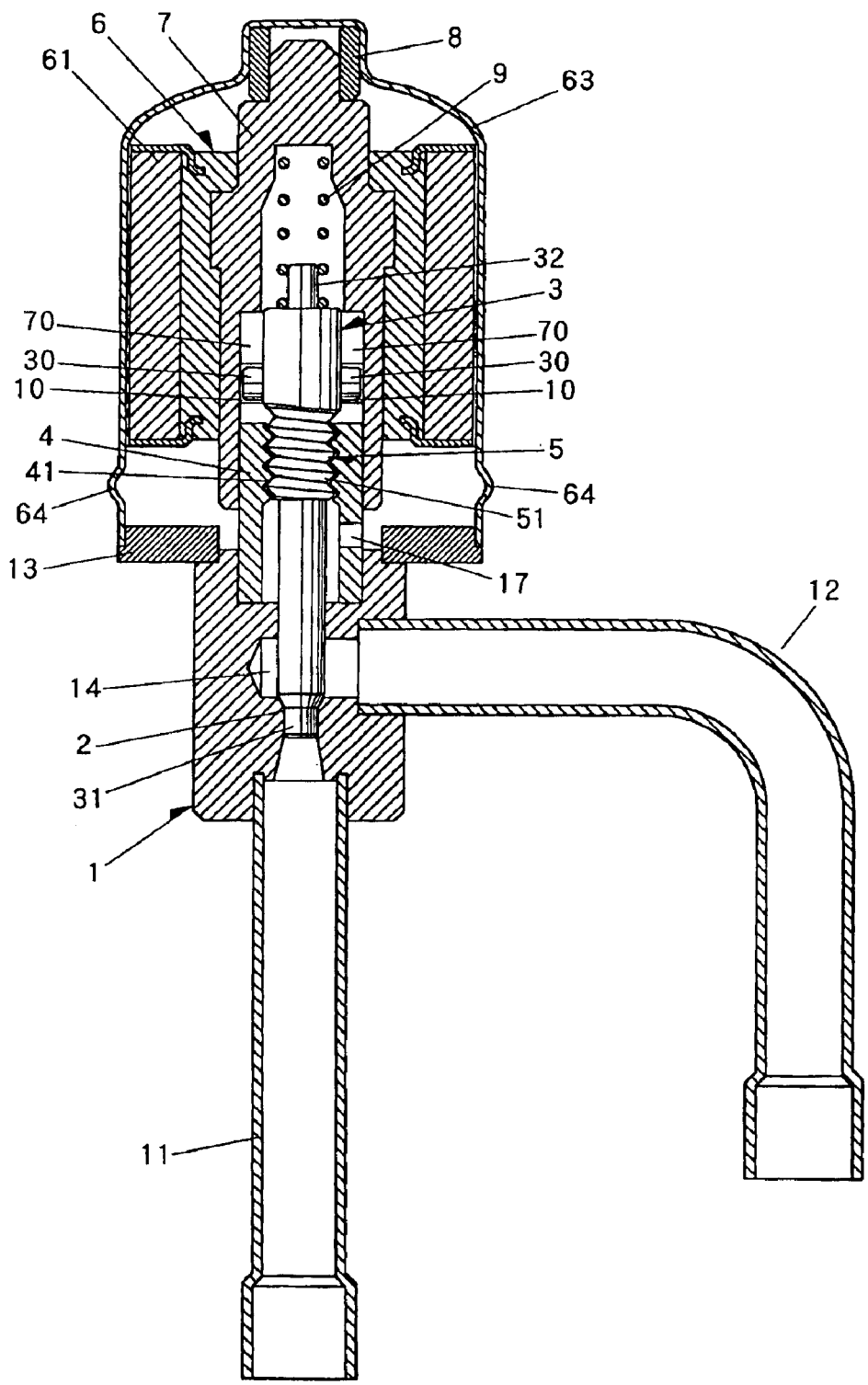
FIG. 11 is a longitudinal sectional view of the second embodiment.
Figure 12:
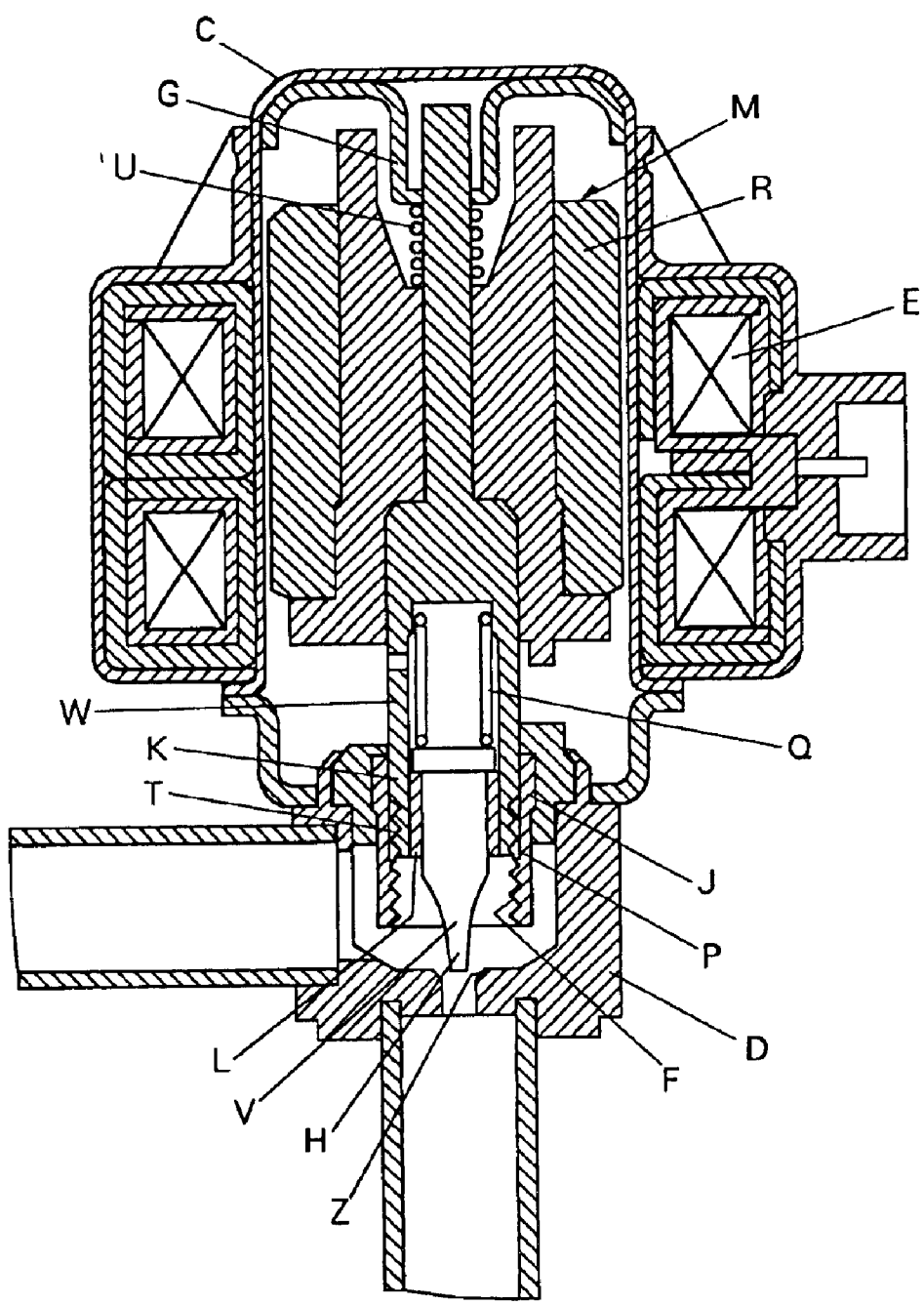
FIG. 12 is a longitudinal sectional view of a conventional art.

FIGS. 10 and 11 show a second embodiment using a relatively elongated valve head 31. A flange 13 is separately formed and brazed to the valve body 1. The side of the inside room 14 of the valve body 1 and the inside of the rotor casing 63 communicate with each other through a pressure equalization bore 17 extending between the inside and the outside of the lower bearing 4.

We claim:

1. An electrically driven valve which comprises a valve spindle moved forwards and backwards following rotation of a driving member by a stepping motor to cause a valve head to be seated on and moved away from a valve seat formed in a valve body, wherein the valve spindle is provided with a screw thread part which meshes with a member that is stationary with respect to the valve body to move the valve spindle forwards and backwards;

wherein interlocking parts including a pin and an interlocking groove are provided between the rotation driving member and the valve spindle, said interlocking parts transmitting a force of rotation of the driving member to the valve spindle when said pin engages said interlocking groove, thereby allowing the valve spindle's forward and backward movement in response to rotation of the driving member; and wherein a bring-back preventing part including a widened groove continuous with said interlocking groove of the interlocking parts is provided to disengage said pin and interlocking groove when the valve spindle is near a position for closing the valve to prevent the drive member from causing said valve head to move away from the valve seat in case the driving member rotates in a valve-opening direction on the basis of exciting pulses supplied to the stepping motor following seating of the valve head on the valve body during a valve closing operation.

* * * * *